US007982422B2

(12) United States Patent
Meewis et al.

(10) Patent No.: US 7,982,422 B2
(45) Date of Patent: Jul. 19, 2011

(54) PUSH BUTTON CONTROL FOR MOTORIZED COVERINGS WITH LIGHT CONTROL

(75) Inventors: Henk Jan Meewis, Arvada, CO (US); Michael S. Holford, Gilbert, AZ (US)

(73) Assignee: Hunter Douglas Inc., Upper Saddle River, NJ (US)

( * ) Notice: Subject to any disclaimer, the term of this patent is extended or adjusted under 35 U.S.C. 154(b) by 41 days.

(21) Appl. No.: 11/623,857

(22) Filed: Jan. 17, 2007

(65) Prior Publication Data

US 2007/0163724 A1 Jul. 19, 2007

Related U.S. Application Data

(60) Provisional application No. 60/760,117, filed on Jan. 19, 2006.

(51) Int. Cl.
*G05B 5/00* (2006.01)

(52) U.S. Cl. ......... 318/466; 318/445; 318/468; 318/469

(58) Field of Classification Search .................. 318/257, 318/264, 468, 266, 286, 466, 469
See application file for complete search history.

(56) References Cited

U.S. PATENT DOCUMENTS

| | | | | | |
|---|---|---|---|---|---|
| 3,887,856 | A | * | 6/1975 | Cicchiello | 388/822 |
| 5,793,174 | A | * | 8/1998 | Kovach et al. | 318/468 |
| 5,847,526 | A | * | 12/1998 | Lasko et al. | 318/471 |
| 5,907,227 | A | * | 5/1999 | Domel et al. | 318/480 |
| 5,990,646 | A | * | 11/1999 | Kovach et al. | 318/468 |
| 6,057,658 | A | * | 5/2000 | Kovach et al. | 318/16 |
| 6,060,852 | A | * | 5/2000 | Domel et al. | 318/480 |
| 6,066,931 | A | * | 5/2000 | Morris et al. | 318/445 |
| 6,082,433 | A | * | 7/2000 | Vafaie et al. | 160/310 |
| 6,100,659 | A | * | 8/2000 | Will et al. | 318/466 |
| 6,166,350 | A | * | 12/2000 | Sickels | 219/137.71 |
| 6,184,641 | B1 | * | 2/2001 | Crimmins et al. | 318/466 |
| 6,201,364 | B1 | * | 3/2001 | Will et al. | 318/466 |
| 6,497,267 | B1 | * | 12/2002 | Azar et al. | 160/310 |
| 6,816,308 | B1 | * | 11/2004 | Shopp | 359/461 |
| 6,983,783 | B2 | * | 1/2006 | Carmen et al. | 160/120 |
| 7,147,029 | B2 | | 12/2006 | Kovach et al. | |
| 7,281,565 | B2 | * | 10/2007 | Carmen et al. | 160/310 |

* cited by examiner

*Primary Examiner* — Bentsu Ro
*Assistant Examiner* — David S Luo
(74) *Attorney, Agent, or Firm* — Dorsey & Whitney LLP

(57) ABSTRACT

An improved system for controlling motorized window coverings with light control includes an improved control system including a switch with an up button, a stop button and down button to activate a motor to control the configuration of the covering, including the extension or retraction of the covering, and the transmissivity of the covering.

27 Claims, 9 Drawing Sheets

PUSH BUTTON CONTROL FOR MOTORIZED COVERINGS WITH LIGHT CONTROL

CROSS REFERENCE TO RELATED APPLICATION

This application claims priority to U.S. provisional application No. 60/760,117 filed Jan. 19, 2006 and is hereby incorporated by reference as if fully disclosed herein.

INVENTIVE FIELD

The inventive field is directed towards devices, systems and methods for controlling motorized window coverings with light control. More specifically, the inventive field relates to the hardware and/or software utilized in a device, system and/or method and includes a control system, one or more switches with push buttons and various motors, actuators and assemblies used to control the operation of the motorized window covering with light control.

BACKGROUND

It is well known that it is frequently desirable to place retractable coverings on architectural openings such as windows. It is also desirable to be able to adjust the transmissivity of the retractable covering. A proposal to solve the problem of a retractable covering for an architectural opening is disclosed in U.S. patent application, entitled "Remote Control Operating System and Support Structure for a Retractable Covering for an Architectural Opening," Joseph E. Kovach et al., filed Dec. 10, 2003, U.S. application Ser. No. 10/732,747, now U.S. Pat. No. 7,147,029 (the subject matter of which is incorporated herein by reference in its entirety).

Although various control systems exist for operating retractable coverings, there remains a need for improved devices, systems and/or methods used to control the retraction, extension and transmissivity of window and other architectural coverings.

Prior attempts to control the automated retraction and extension of a covering have employed remote controls or manual switches with up and down buttons. Such control systems generally result in the extension or retraction of a window covering at a single speed. What is needed are devices, systems and methods which support the extension and/or retraction of a covering at varying speeds. Further, such an invention desirably supports the automated opening or closing (or therebetween) of the covering, for purposes of transmissivity or the like, but at desired speeds.

SUMMARY

A method is disclosed for using a switch with a plurality of buttons to activate a motor to control the configuration of a window covering. The method comprises monitoring a signal from the switch to detect the pressing of a button; monitoring the speed of the covering; upon determining that a button is pressed, setting the speed and direction of motor rotation; and upon determining that no button is pressed, setting the speed of motor rotation.

A control system is disclosed for activating a motor to adjust a window covering. The control comprises a switch having a plurality of buttons; a microprocessor adapted to (a) monitor a signal from the switch to detect the pressing of a button; (b) monitor the speed of the covering; (c) upon detecting the pressing of a button, setting the speed and direction of motor rotation; and (d) upon detecting that no button is pressed, setting the speed of motor rotation.

Other embodiments utilize a motor with a plurality of speeds such that a first speed is used to position the covering while a second speed is used to rapidly extend or retract the covering. Other embodiments of the present invention use limit stops to prevent over/under extension of the covering.

DETAILED DESCRIPTION

Figure 1:
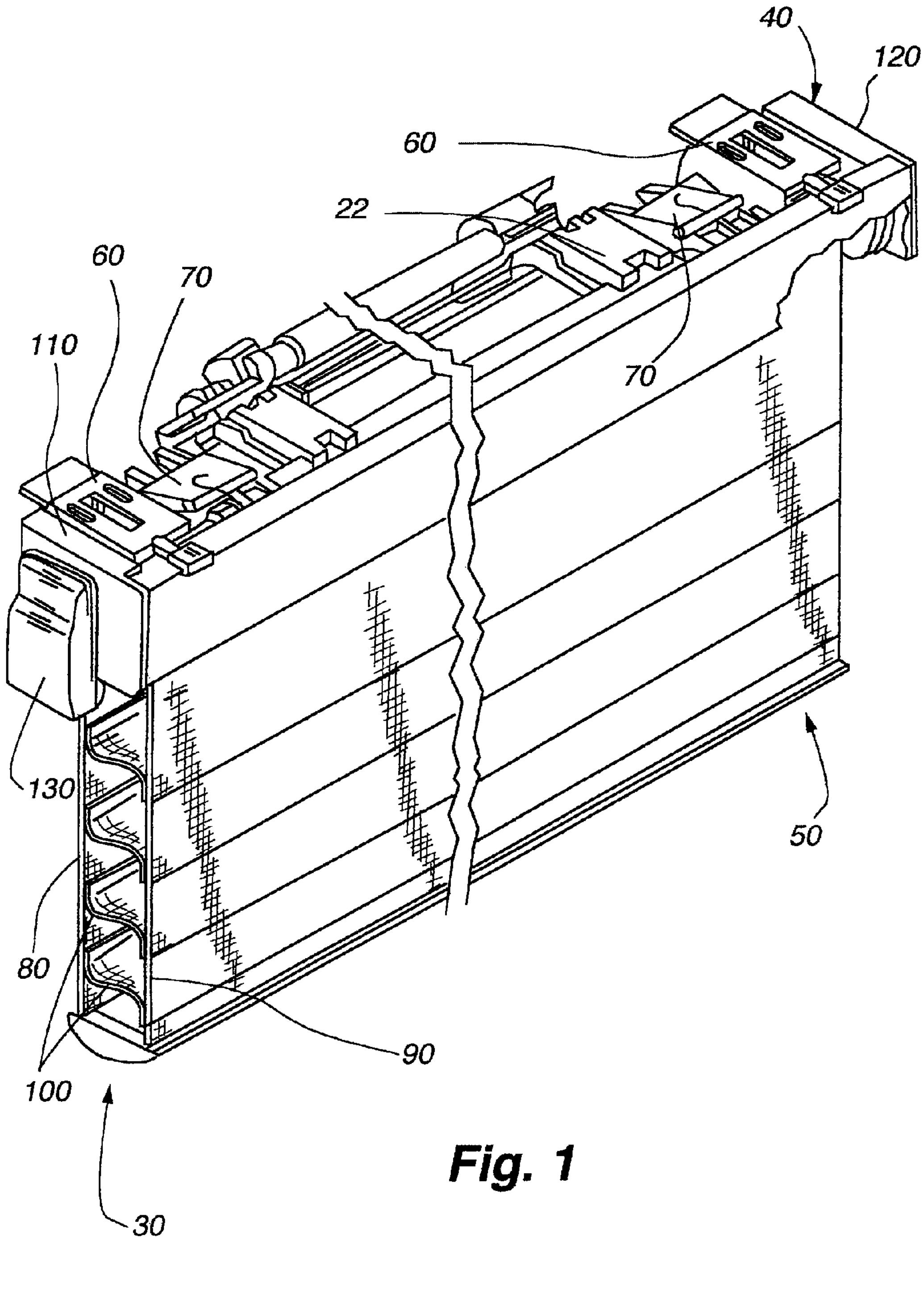
FIG. 1 is a fragmentary isometric view of the top and front of a retractable covering.
Figure 2:
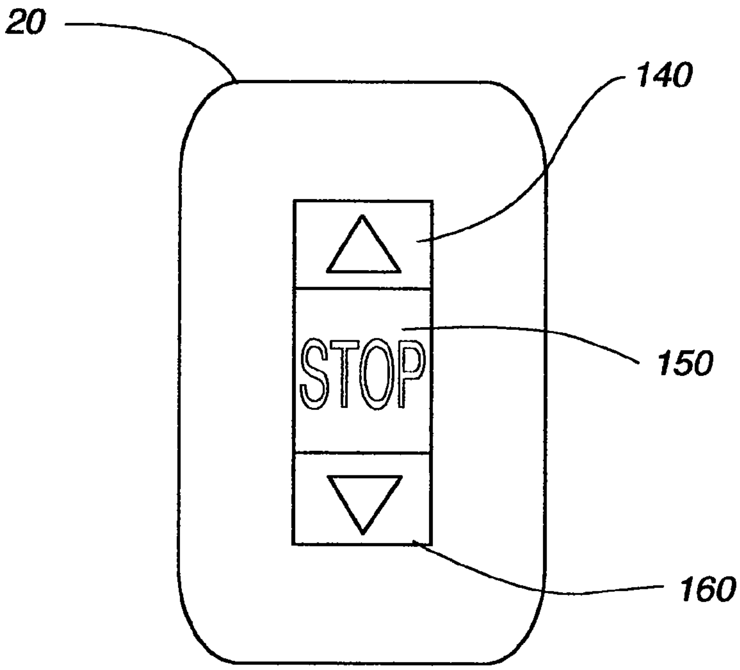
FIG. 2 is a front view of a switch suitable for use with at least one embodiment of the present invention including, without limitation, the embodiment shown in FIG. 1.

In general, the various embodiments disclosed herein relate to devices, systems and methods for controlling a retractable covering for architectural openings such as windows. As depicted in FIGS. 1 and 2 for one embodiment, the apparatus comprises a control system which can be mounted, for example, in a switch 20 (or provided elsewhere in the system). The control system is configured to control the extending, retracting, and otherwise adjusting of one or more coverings, such as the covering 30 shown in FIG. 1. The covering 30 can be attached between a head rail 40 and a bottom rail 50. The control system may be operated using the switch 20. Mounting brackets 60 can be used to attach the head rail 40 to a desired mounting surface (e.g., a wall above the window). Two limit switches 70 can be utilized to prevent over-retraction and/or under-retraction of the covering 30. An example of a covering 30 suitable for use with one or more of the various embodiments of the present invention can include, but is not limited to, a first flexible sheet 80 and a second flexible sheet 90 with vanes 100 attached between these first and second flexible sheets, respectively. The first and second flexible sheets 80, 90, respectively, are secured to the bottom rail 50. Left and right end caps, 110, 120, respectively, support components, aesthetically shield various internal components from view, and include auxiliary support pockets 130 that may be used in select applications to position the head rail 40 above a window opening to be covered. In one embodiment, the control system monitors a switch 30 having an up button 140, a stop button 150, and a down button 160. Based upon signals received from such buttons, the control system can control the direction, configuration (e.g., full open, partially open and the like) and speed of movement of the covering. In one embodiment, a reversible, direct current (dc) motor (not shown) is used to move the covering. Likewise, the motor may be used to facilitate the adjusting of the transmissivity of the covering. Further, it is to be appreciated that one or more motors may be used.

Figure 3:
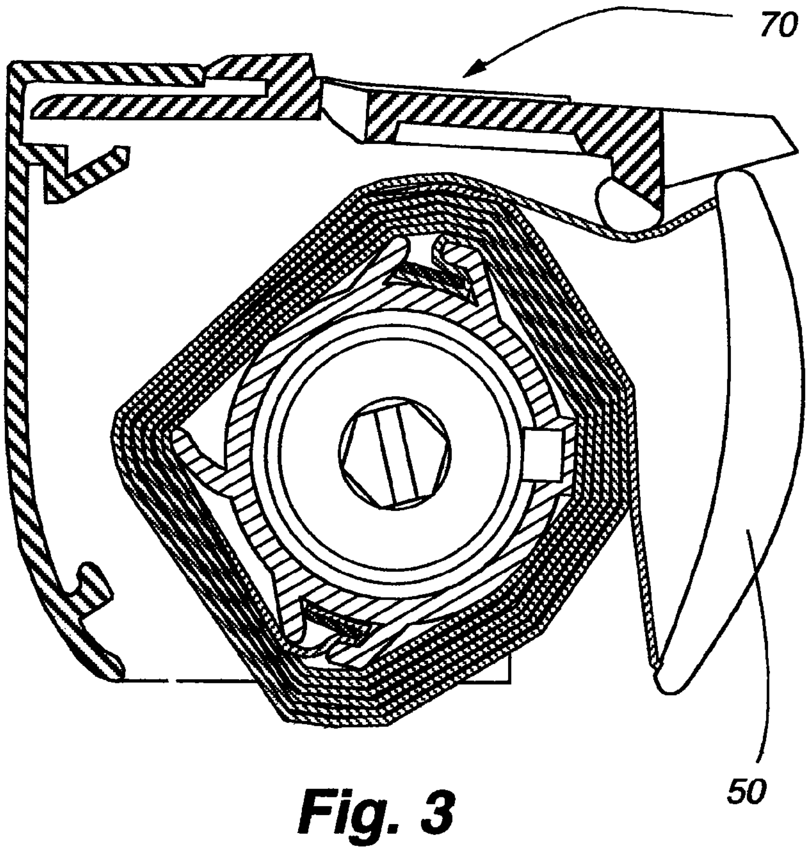
FIG. 3 is a cross-sectional view of the head rail used, for example, in the embodiment shown in FIG. 1, wherein the covering is in its fully retracted configuration.

The general operation of one embodiment of a retractable covering 10, suitable for use in various embodiments is described next. The covering 30 may be in the configuration depicted in FIG. 3, which is in its most retracted configuration. To lower the retractable covering 30, the down button 160 on the switch 20 can be pressed. The down button can be pressed for a predetermined minimum time. For example, in one embodiment, a minimum time period of two seconds is utilized. In other embodiments, the down button 160 may be pressed over a range of time periods (e.g., more than two seconds but less than four seconds or the like). Further, the control system can be configured such that when the down button is first pressed for a first time period, the motor begins to extend the covering at a slow speed. In at least one embodiment, once the down button 160 has been depressed for at least the predetermined minimum time period (in this example, two seconds), the motor switches from a first speed to a second speed while extending the covering 30. For certain embodiments, the first speed may be slower than the second speed. For this embodiment, once the motor is operating at the second speed, it will continue to extend the cover 30, even if the down button is released, until the fully extended position is reached. However, upon the subsequent pressing of any button on switch 20, while the cover is being extended, at either the first or second speeds, the control system will instruct the motor to stop the extension of the cover. When the blind is in the resulting "fully opened" configuration, any further pressing of the down button 160 on switch 20 has no effect on the configuration of the covering 30.

Limit stops 70 can be used to prevent over-extension of the retractable covering 10. Likewise, timers, potentiometers, and various other well known sensors and/or actuators can be used to prevent the over/under extension of the covering. Further, it is to be appreciated that precise positioning of the cover 30 can be accomplished by using one of the at least two available operating speeds, for example, a slower of the at least two speeds. A slower of the at least two operating speeds can be initiated upon the control system detecting that the down button 160, for example, has been depressed for less than the predetermined minimum time (e.g., for less than two seconds in at least one embodiment). In this mode the motor continues to operate at slow speed while extending the cover 30.

Further, the control system may be configured such that, when operating in the slower of the at least operating modes, upon releasing the down button, the extension of the cover automatically stops.

Figure 4:
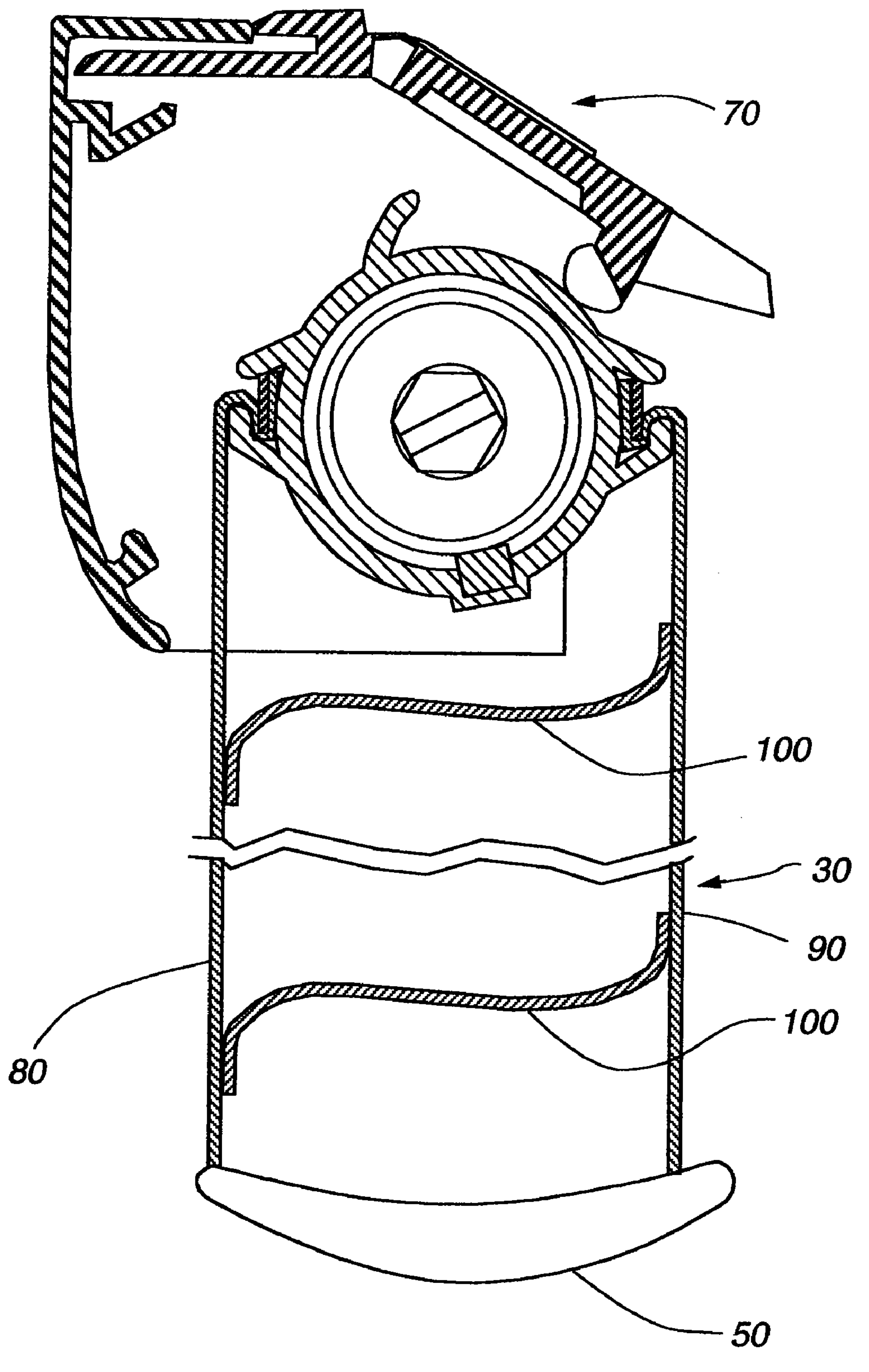
FIG. 4 is a cross-sectional view of the head rail used, for example, in the embodiment shown in FIG. 1, wherein the covering is in its fully extended configuration.

The covering 30 may be in its fully open configuration as shown in FIG. 4. To raise the retractable covering 10, the up button 140 on switch 20 is pressed for a desired minimum time, for example, two seconds. When the up button 140 is first pressed, the motor begins to retract the covering at a first speed. Once the up button has been depressed for the desired minimum time, the motor switches from the first speed to a second speed while retracting the covering. As before, the first speed can be slower or faster than the second speed. Once the motor is operating at the second speed, it will continue to retract the covering even if the up button is released. Pressing any button again on switch 20 will stop the motor and retraction of the covering. If not stopped, the motor will continue to retract the covering until the covering is at its highest position. When the blind is in the resulting "fully closed" configuration, any further pressing of the up button 140 on switch 20 has no effect on the configuration of the covering.

Limit stops 70 can be used to prevent over-retraction of the retractable covering 10. When precise positioning of the covering 30 is desired, the covering can be raised using the first speed. This is done by tapping the up button 140. For at least one embodiment, less than two second taps can be used to control the operation of the blind. In this mode, the motor continues to operate at the first speed while retracting the covering 30. Releasing the up button automatically stops the motor and retraction of the covering.

When the covering 30 is stopped in an intermediate position, it may be raised or lowered by pressing the up button 140 or down button 160, respectively.

Transmissivity of the extended covering 30 is also fully adjustable using switch 20. When the covering is in its fully extended configuration, the transmissivity of the covering (i.e., the amount of light or air that is permitted to pass through the covering) may be adjusted by toggling between the up and down buttons, 140, 160, respectively. This causes the motor to operate at its first speed while configuring the transmissivity of the covering. By toggling between the up and down buttons, the covering can be configured for maximum transmissivity, minimum transmissivity, or any desired level of transmissivity between the maximum and the minimum.

Pressing the stop button 150 on switch 20 causes the blind 30 to stop moving if it is in motion. If any button on switch 20 is pressed while the covering 30 is moving at the second speed, the covering stops moving.

For example, if the covering 30 is being extended and the bottom rail 50 is traveling downward at the second speed but has not yet reached its lowest point of travel, if the up button 140, the down button 160, or the stop button 150 on switch 20 is pressed and released, the control system instructs the motor to cease all motion of the covering 30. If the down button 160 is then pressed, the motor will be commanded to continue extending the covering 30 at the first speed. If, on the other hand, the up button 140 is pressed after the covering 30 was stopped, the motor will be commanded to reverse the direction of rotation, and will begin to retract the covering 30 at the first speed. Similarly, if the covering 30 is being retracted at the second speed and the up button 140, the down button 160 or the stop button 150 is pressed and released, retraction of the covering 30 stops. Then, if the up button 140 is pressed again, retraction of the covering 30 commences at the first speed. If, on the other hand, the down button 160 is pressed after stopping the retraction of the covering 30, the motor will begin to rotate at the first speed so as to extend the covering 30.

In summary, if any button on the switch 20 is pressed while the motor is operating at the second speed and the covering 30 has not yet reached a fully extended or fully retracted configuration, the motor will be commanded to stop moving the covering.

While the various embodiments discussed hereinabove have been described with respect to two operating speeds, it is to be appreciated that any number of operating speeds may be utilized in conjunction with the present invention. When three or more operating speeds are utilized, the control system can be configured to sequentially proceed through the operating speeds, to automatically return to a slowest operating speed when any button is pushed at a faster operating speed, to automatically proceed to the fastest operating speed (for example, button holds of longer than five (5) seconds and the like).

Figure 5:
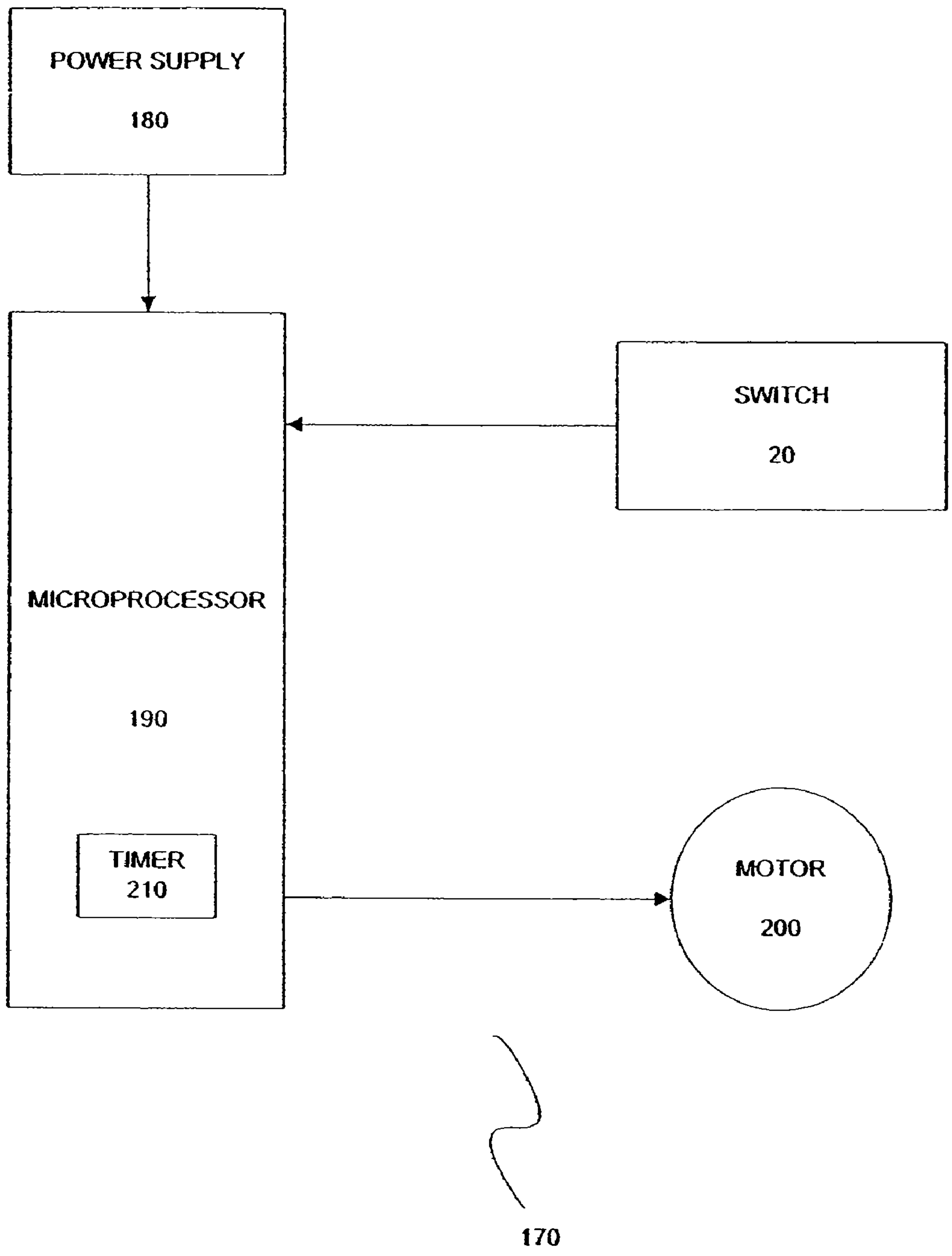
FIG. 5 is a block diagram of a control system.

FIG. 5 is a block diagram of the control system electronics. Power supply 180 supplies power to the electronics. Batteries and other alternative power systems can additionally or separately be used to power the control system, device and systems. Microprocessor 190 monitors switch 20 to detect whether or not a button is pressed. Timer 210 is used by microprocessor 190 to determine when a button has been pressed for a minimum amount of time (for example, two seconds). A motor 200 is controlled by microprocessor 190 to retract, extend or adjust the transmissivity of the covering 30.

Figure 6:
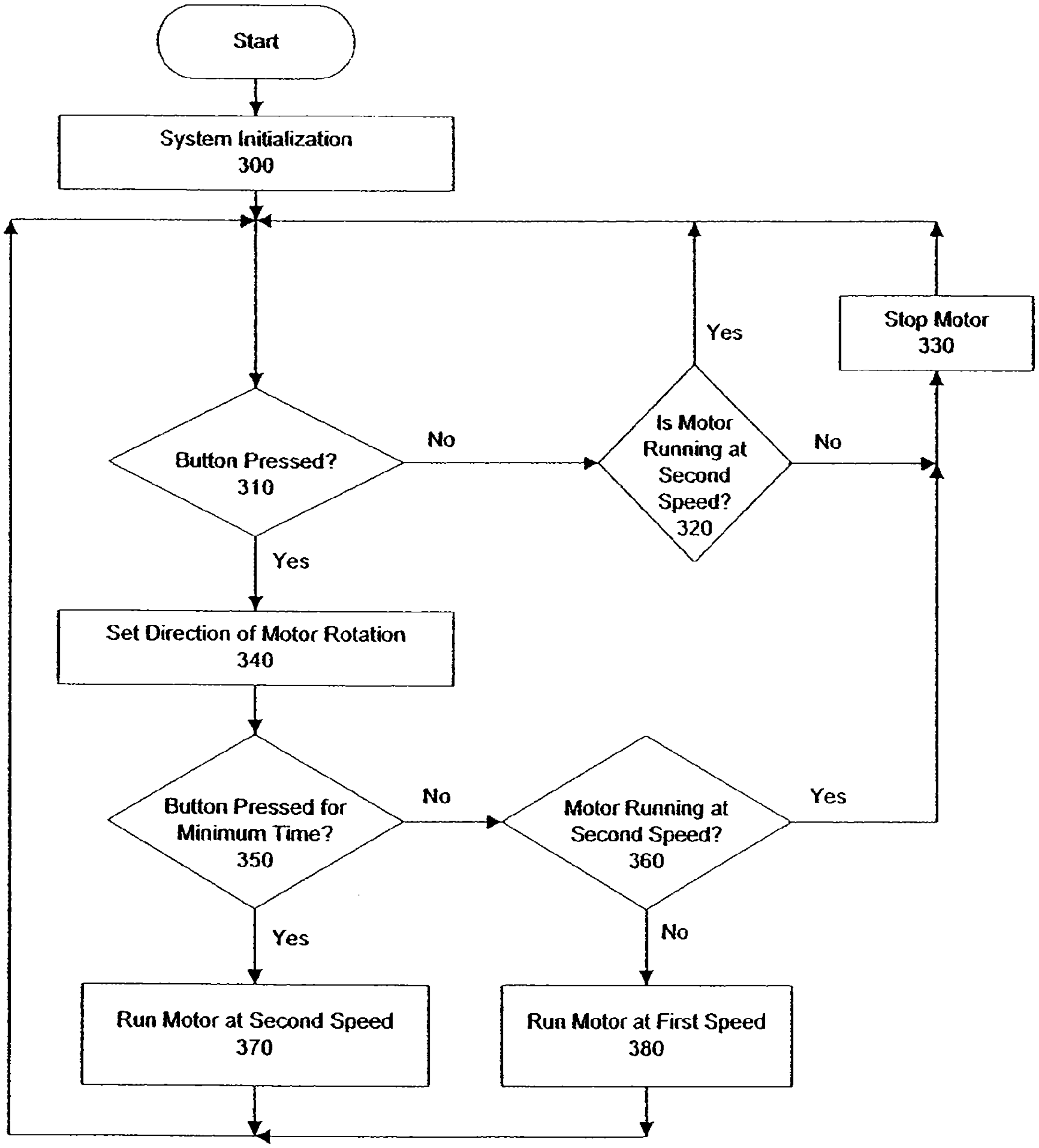
FIG. 6 is a flow chart of the logic used by a control system.

FIG. 6 comprises a flow chart representation of the logic used by the control system for one embodiment of the present invention. The logic may be implemented in software or firmware for execution by the microprocessor. All times shown in the flow chart are nominal. Actual times may vary. For at least one embodiment, times may vary by +–25%. Items in a box are actions that are performed. Items in a diamond are tests that are made and the possible outcomes are written next to the arrows leaving the diamond.

The following scenarios provide examples of how the control system electronics operate for various embodiments having a varying number of buttons on switch 20, a varying number of speeds for the motor 200 and limit stops 70.

FIG. 6 shows one embodiment of the logic executed by the control system electronics. When power is first applied, for example, upon a reset, the control system is initialized by, for example, commanding the motor to stop, resetting the timer 210 to zero, and performing any other operations necessary or desired to put the control system into a known state (Operation 300). The control system then determines if a button on switch 20 is pressed (Operation 310). If a button is pressed, the control system determines which button on switch 20 has been pressed and instructs the motor 200 to begin rotating and thereby retracting or extending the covering in the corresponding direction (Operation 340). The control system also determines if the button has been pressed for a minimum time, for example, but not limited to, two (2) seconds (Operation 350). If the button has been pressed for the minimum time, the motor 200 is instructed to rotate at a second speed (which in one embodiment is faster than the first speed) resulting in the covering being extended or retracted faster (Operation 370). The control system then returns to Operation 310.

Referring back to Operation 310, if no button is pressed on switch 20 the control system determines if motor 200 is operating at its second speed (Operation 320). If the motor is operating at its second speed, the control system takes no further action (e.g., the window covering continues to be extended or retracted at high speed). That is, once a button has been pressed for the minimum time, it can be released and the motor will continue to move the covering at the second speed. The control system then returns to Operation 310. Referring back to Operation 320, if the motor is not running at its second speed, the control system instructs the motor 200 to stop thereby stopping movement of the covering (Operation 330). That is, if the covering is being moved at the first speed when the button is released, movement of the covering is stopped. Positioning of the covering can be achieved by toggling between the up and down buttons. The control system then returns to Operation 310.

Referring back to Operation 350, if the button has not been pressed for the minimum time, the control system determines if motor 200 is running at its second speed (Operation 360). If the motor is running at its second speed, the control system commands the motor to stop (Operation 330). That is, the covering was being extended or retracted by motor 200 at the second speed when a button is pressed indicating that movement of the covering is to be stopped. The control system then returns to Operation 310. Referring back to Operation 360, if the motor is not running at its second speed, the control system instructs the motor 200 to run at its first speed (Operation 380). The control system then returns to Operation 310.

Figure 7:
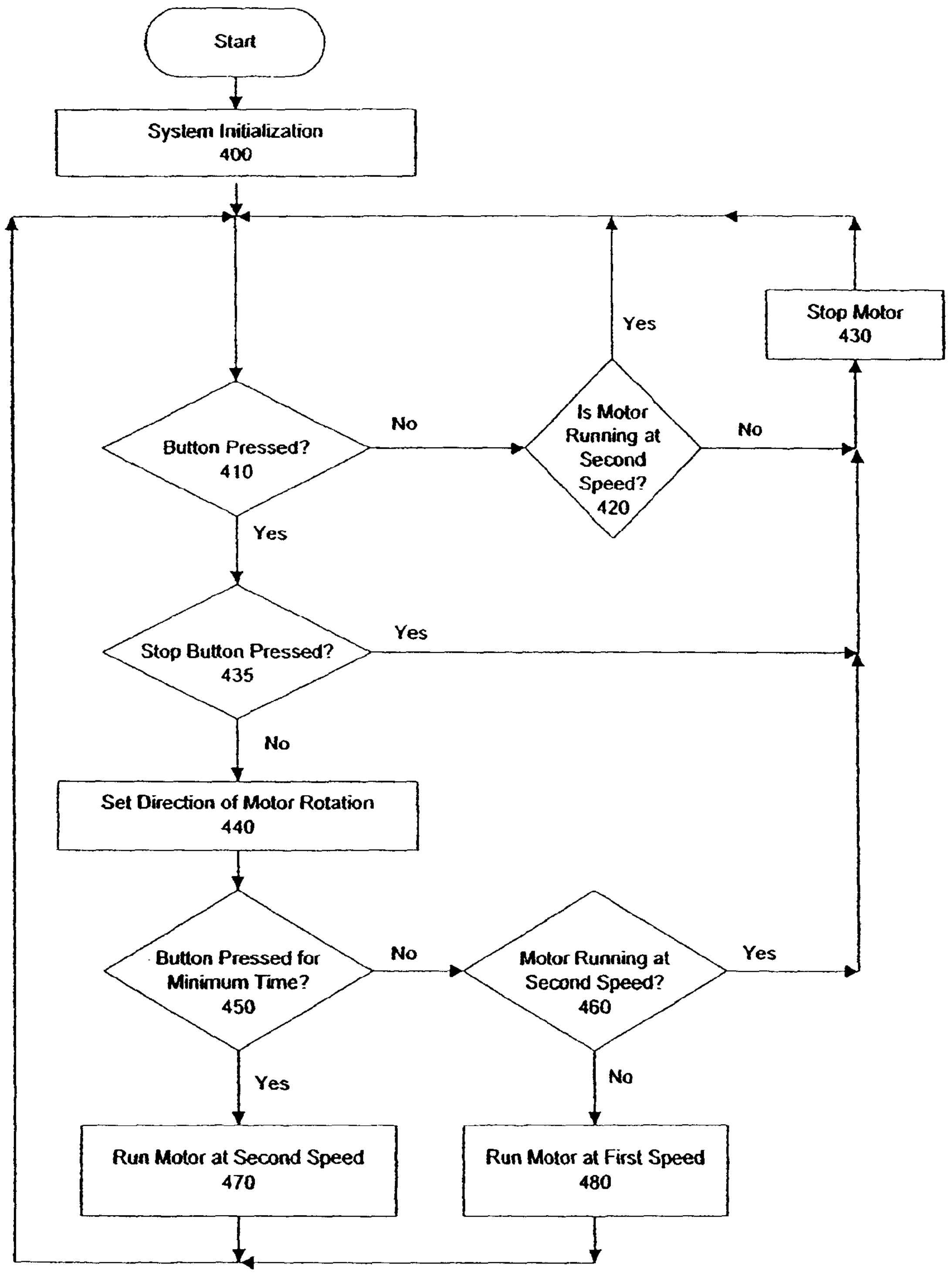
FIG. 7 is a flow chart of the logic used by a control system.

FIG. 7 shows another embodiment of the logic executed by the control system electronics when switch 20 has a stop button in addition to an up button and down button. The operation of the control system is similar to that described in FIG. 6 except for the following differences. When the control system determines that a button has been pressed (Operation 410), the control system then determines if the stop button on the switch 20 has been pressed (Operation 435). If the stop button has been pressed, the control system instructs the motor 200 to stop (Operation 430). The control system then returns to Operation 410. Referring back to Operation 435, if the stop button has not been pressed, the control system determines which other button on switch 20 has been pressed and instructs the motor 200 to begin rotating and thereby retracting or extending the covering in the corresponding direction (Operation 440). The other operations of the control system are as described for FIG. 6.

Figure 8:
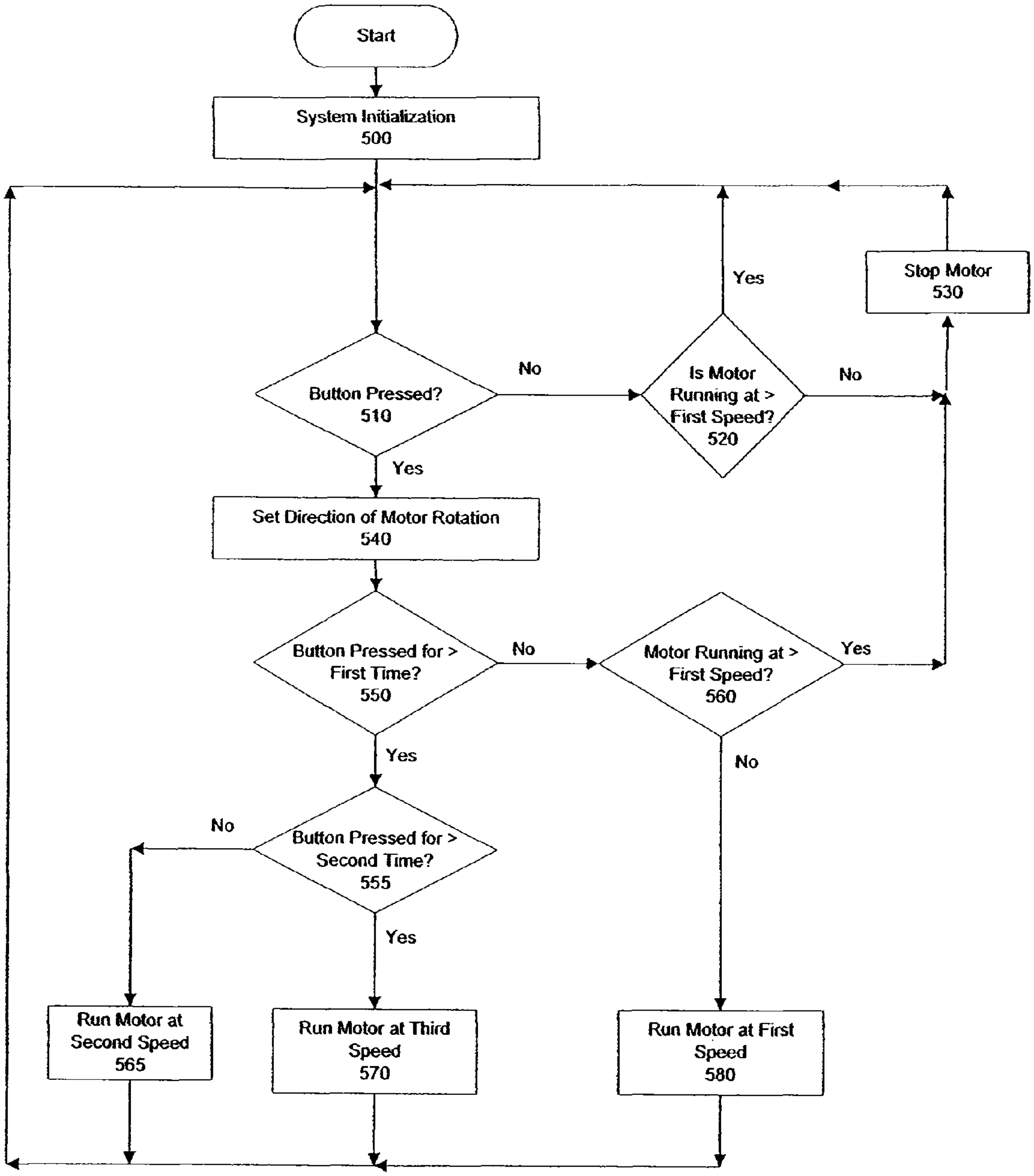
FIG. 8 is a flow chart of the logic used by a control system.

FIG. 8 show another embodiment of the logic executed by the control system electronics when the motor 200 has a first speed, a second speed and a third speed. The operation of the control system is similar to that described in FIG. 6 except for the following differences. After the control system determines which button on switch 20 has been pressed and instructs the motor 200 to begin rotating and thereby retracting or extending the covering in the corresponding direction (Operation 540), the control system then determines if the button has been pressed for a first minimum time, for example, but not limited to, two (2) seconds (Operation 550). If the button has not been pressed for the first minimum time, the control system determines if the motor 200 is running at a speed greater than the first speed (Operation 560). If the motor 200 is running at a speed greater than the first speed, the control system instructs the motor to stop moving the covering 200 (Operation 530). When the motor 200 is running at a speed other than the first speed, the pressing of a button indicates that movement of the covering 30 is to be stopped. The control system then returns to Operation 510.

Referring back to Operation 560, if the motor 200 is not running at a speed greater than the first speed, the control system instructs the motor 200 to rotate at its first speed. The control system then returns to Operation 510. Referring back to Operation 550, if the button has been pressed for more than the first minimum time, the control system then determines if the button has been pressed for a second minimum time, for example, but not limited to, four (4) seconds (Operation 555). If the button has been pressed for the second minimum time, the control system instructs the motor 200 to rotate at its third speed (Operation 570). That is, the motor 200 is rotating at its second speed and the button has been pressed for the second minimum time indicating that the covering is to be moved at the third speed. The control system then returns to Operation 510. Referring back to Operation 555, if the button has not been pressed for the second minimum time, the control system instructs the motor to run at its second speed (Operation 565). That is, the motor has been rotating at its first speed and the button has been pressed for the first minimum time indicating that the covering is to be moved at the second speed. The control system then returns to Operation 510. The other operations of the control system are as described for FIG. 6.

Figure 9:
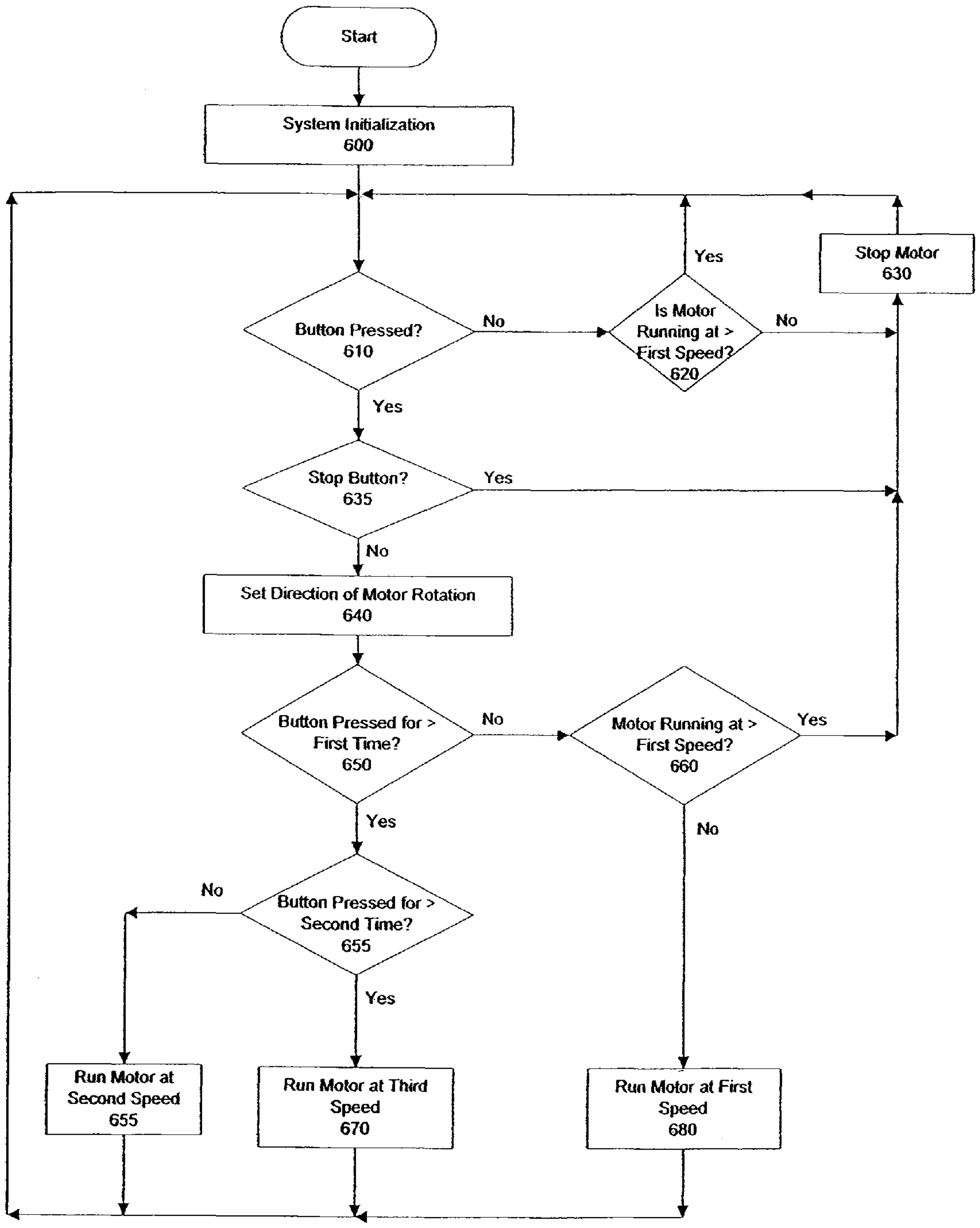
FIG. 9 is a flow chart of the logic used by a control system.

FIG. 9 shows yet another embodiment of the logic executed by the control system for motor 200 having three speeds and switch 20 having an up button, a stop button and a down button. The operation of the control system is similar to that described in FIG. 8 except for the following differences. When the control system determines that a button has been pressed (Operation 610), the control system then determines if the stop button on the switch 20 has been pressed (Operation 635). If the stop button has been pressed, the control system instructs the motor 200 to stop (Operation 630). The control system then returns to Operation 610. Referring back to Operation 635, if the stop button has not been pressed, the control system determines which other button on switch 20 has been pressed and instructs the motor 200 to begin rotating and thereby retracting or extending the covering in the corresponding direction (Operation 640). The other operations of the control system are as described for FIGS. 6 and 8.

Figure 10:
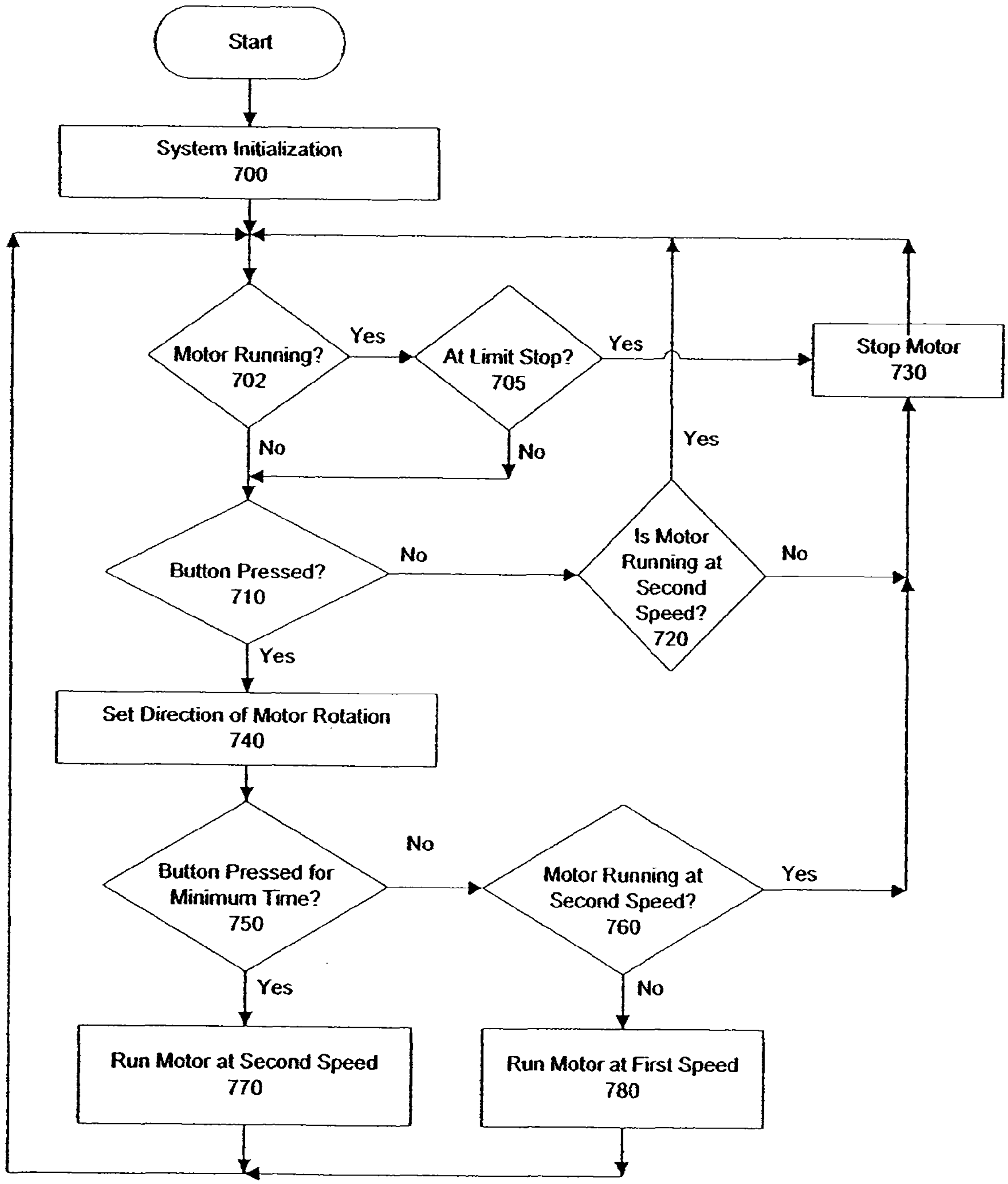
FIG. 10 is a flow chart of the logic used by a control system.

FIG. 10 shows yet another embodiment of the logic executed by the control system when limit stops 70 are used to prevent the motor 200 from over rotating. The operation of the control system is similar to that described in FIG. 6 except for the following differences. After the control system has been initialized (Operation 700), the control system determines if the motor 200 is rotating (Operation 702). If the motor 200 is running, the control system then determines if a limit stop 70 has been reached indicating that the covering has either been fully extended or fully retracted (Operation 705). If the limit stop 70 has been reached, the control system instructs the motor 200 to stop (Operation 730). The control system then returns to Operation 702. Referring back to Operation 705, if the limit stop 70 has not been reached, the control system then determines if a button has been pressed (Operation 710).

Referring back to Operation 702, if the motor 200 is not running, the control system determines if a button has been pressed (Operation 710). The other difference is that after the control system either runs the motor 200 at its second speed (Operation 770) or at its first speed (Operation 780), the control system returns to Operation 702. The other operations of the control system are as described for FIG. 6.

Although various embodiments of this invention have been described above, those skilled in the art could make numerous alterations to the disclosed embodiments without departing from the spirit or scope of this invention. Further, all references (e.g., first, second, up, down, leftward, rightward, bottom, top, inner, outer, above, below, clockwise, and counterclockwise) used above are to aid the reader's understanding of the present invention, but should not create limitations, particularly as to the orientation of the apparatus. It is intended that all matter contained in the above description or shown in the accompanying drawings shall be interpreted as illustrative only and not limiting.

What is claimed is:

1. A method of using a switch having a plurality of buttons to activate a motor to control the configuration of a window covering, said method comprising:

(a) monitoring a signal from a switch for an actuation of one of the plurality of buttons;

(b) monitoring a first speed of the covering corresponding to a first speed of motor rotation;

(c) upon recognizing a duration of the button actuation using a timer, setting and adjusting the speed of motor rotation based on the duration of the button actuation, and setting a direction of motor rotation; and (d) upon recognizing that the button is no longer actuated, maintaining the speed of motor rotation.

2. The method of claim 1 wherein the switch comprises an up button and a down button.

3. The method of claim 1 further comprising monitoring at least one limit stop to set the speed of motor rotation.

4. The method of claim 1 further comprising monitoring a timer to set the speed of motor rotation.

5. The method of claim 4 wherein the speed of motor rotation further comprises a second speed that is either faster or slower than the first speed.

6. The method of claim 4 wherein the speed of motor rotation further comprises a second speed and a third speed.

7. The method of claim 1 wherein the speed of motor rotation comprises a plurality of speeds.

8. The method of claim 1, further comprising determining the button is actuated for at least a threshold time, and in response to determining the button is not actuated for at least a threshold time, stopping the covering or moving the covering at the first speed.

9. The method of claim 1, further comprising determining the button is actuated for at least a threshold time, and in response to determining the button is actuated for at least a threshold time, moving the covering at a second speed different than the first speed of the covering, determining the button is actuated for at least a second threshold time, and in response to determining the button is actuated for at least the second threshold time, moving the covering at a third speed different from the first and second speeds.

10. The method of claim 9, wherein if the button is actuated for at least the first threshold time but not for at least the second threshold time, the covering is moved at the second speed.

11. An apparatus for controlling a window treatment for covering an architectural opening comprising:

a switch having a plurality of buttons;

a motor;

control logic operably connected to the switch and the motor and programmed to:

(a) monitor a signal from the switch to detect an actuation of a button;

(b) monitor a first speed of the covering corresponding to a first speed of motor rotation;

(c) upon detecting the actuation of a button, setting a speed of motor rotation and a direction of motor rotation; and (d) upon detecting a duration of the actuation of the button using a timer, setting the speed of motor rotation based on said duration of actuation.

12. The apparatus of claim 11, wherein the control logic is further programmed to determine the button is actuated for at least a threshold time, and in response to determining the button is not actuated for at least a threshold time, stop the covering or set the speed of motor rotation to move the covering at the first speed.

13. The apparatus of claim 11, wherein the control logic is further programmed to determine the button is actuated is present for at least a threshold time, and in response to determining the button is actuated for at least a threshold time, set the speed of motor rotation to move the covering at a second speed different than the first speed of the covering, determine the button is actuated for at least a second threshold time, and in response to determining the button is actuated for at least the second threshold time, set the speed of motor rotation to move the covering at a third speed different from the first and second speeds.

14. The apparatus of claim 13, wherein the control logic is further programmed to set the speed of motor rotation to move the covering at the second speed if the button is actuated for at least the first threshold time but not for at least the second threshold time.

15. A control for activating a motor to adjust a window covering, the control comprising:

a switch having a plurality of buttons;

a microprocessor programmed to:

(a) monitor a signal from the switch to detect an actuation of one of the plurality of buttons;

(b) monitor a first speed of the covering corresponding to a first speed of motor rotation;

(c) upon detecting a duration of the actuation of the button using a timer, setting and adjusting the speed of motor rotation based on the duration of actuation of the button, and setting the direction of motor rotation; and (d) upon detecting that no button is actuated, maintaining the speed of motor rotation.

16. The control of claim 15 wherein the microprocessor is further programmed to monitor at least one limit stop to set the speed of the motor.

17. The control of claim 15 wherein the microprocessor is further programmed to monitor a timer to set the speed of the motor.

18. The control of claim 15 wherein the speed of motor rotation comprises a plurality of speeds.

19. The control of claim 15, wherein the microprocessor is further programmed to determine the button is actuated for at least a threshold time, and in response to determining the button is not actuated for at least a threshold time, stop the covering or set the speed of motor rotation to move the covering at the first speed.

20. The control of claim 15, wherein the microprocessor is further programmed to determine the button is actuated for at least a threshold time, and in response to determining the button is actuated for at least a threshold time, set the speed of motor rotation to move the covering at a second speed different than the first speed of the covering, determine the button is actuated for at least a second threshold time, and in response to determining the button is actuated for at least the second threshold time, set the speed of motor rotation to move the covering at a third speed different from the first and second speeds.

21. The control of claim 20, wherein the microprocessor is further programmed to set the speed of motor rotation to move the covering at the second speed if the button is actuated for at least the first threshold time but not for at least the second threshold time.

22. A method for controlling the configuration of a covering for an architectural opening, comprising:

detecting a signal generated by a change in state of a contact;

in response to detecting the signal, moving the covering at a first speed;

monitoring a speed of motion of the covering;

determining the signal is present for at least a threshold time using a timer; and in response to determining the signal is present for at least the threshold time, moving the covering at a second speed different than the first speed.

23. The method of claim 22, wherein, if the signal is not present for at least a threshold time, the covering is either stopped or moved at the first speed.

24. The method of claim 22, further comprising determining the signal is present for at least a second threshold time, and in response to determining the signal is present for at least the second threshold time, moving the covering at a third speed different from the first and second speeds.

25. The method of claim 24, wherein if the signal is present for at least the first threshold time but not for at least the second threshold time, the covering is moved at the second speed.

26. The method of claim 22, wherein the second speed is faster than the first speed.

27. A method of using a switch having a plurality of buttons to activate a motor to control the speed of an extendible window covering, said method comprising:

(a) detecting a signal from a switch for an actuation of one of the plurality of buttons;

(b) in response to detecting the actuation of one of the plurality of buttons, moving the covering at a first speed;

(c) measuring a duration of the button actuation using a timer;

(d) comparing the measured duration of the button actuation to a first threshold time period;

(e) if the measured duration of the button actuation is greater than the first threshold time period, moving the covering at a second speed different than the first speed; and (f) if the measured duration of button actuation is less than the first threshold time period, maintaining the speed of the covering at the first speed.

* * * * *